United States Patent [19]
Lundin et al.

[11] Patent Number: 5,103,701
[45] Date of Patent: Apr. 14, 1992

[54] DIAMOND TOOL MACHINING OF MATERIALS WHICH REACT WITH DIAMOND

[75] Inventors: Ralph L. Lundin; Delbert D. Stewart, both of Los Alamos, N. Mex.; Christopher J. Evans, Gaithersburg, Md.

[73] Assignee: The United States of America as represented by the United States Department of Energy, Washington, D.C.

[21] Appl. No.: 678,488

[22] Filed: Apr. 1, 1991

[51] Int. Cl.⁵ ................................ B23Q 11/12
[52] U.S. Cl. ........................ 82/173; 82/900; 407/11; 408/145; 408/56; 409/136; 51/266; 51/322
[58] Field of Search .......... 407/11, 119, 120; 82/900, 1.11, 173; 408/145, 56, 57; 409/136; 51/266, 322, 356

[56] References Cited

U.S. PATENT DOCUMENTS

| | | | |
|---|---|---|---|
| 3,077,802 | 2/1963 | Philip | 407/11 |
| 3,137,184 | 6/1964 | Meyers | 407/11 |
| 3,971,114 | 7/1976 | Dudley | 407/120 |
| 4,312,251 | 1/1982 | Schwan | 407/11 |

FOREIGN PATENT DOCUMENTS

| | | | |
|---|---|---|---|
| 243461 | 3/1987 | Fed. Rep. of Germany | 407/11 |
| 259702 | 11/1987 | Japan | 407/120 |
| 8403649 | 9/1984 | PCT Int'l Appl. | 408/56 |
| 1047603 | 10/1963 | U.S.S.R. | 407/11 |
| 1175612 | 8/1985 | U.S.S.R. | 407/11 |
| 1189652 | 11/1985 | U.S.S.R. | 408/56 |

OTHER PUBLICATIONS

C. Evans, "Precision Engineering: an Evolutionary Perspective," MSc Thesis, Cranfield Institute of Technology (Mar. 1987).

Primary Examiner—Larry I. Schwartz
Assistant Examiner—Kevin J. Carroll
Attorney, Agent, or Firm—Milton D. Wyrick; Paul D. Gaetjens; William R. Moser

[57] ABSTRACT

Apparatus for the diamond machining of materials which detrimentally react with diamond cutting tools in which the cutting tool and the workpiece are chilled to very low temperatures. This chilling halts or retards the chemical reaction between the workpiece and the diamond cutting tool so that wear rates of the diamond tool on previously detrimental materials are comparable with the diamond turning of materials which do not react with diamond.

7 Claims, 1 Drawing Sheet

DIAMOND TOOL MACHINING OF MATERIALS WHICH REACT WITH DIAMOND

The invention is a result of a contract with the Department of Energy (Contract No. W-7405-ENG-36), and a contract between the University of Wisconsin and the Department of Commerce (Contract No. 60NANB7D0700).

BACKGROUND OF THE INVENTION

The present invention generally relates to the field of machining of materials and, more particularly to the diamond turning of materials which detrimentally react with diamond.

Diamond turning is an enabling technology for the production of aspherical optical surfaces, and for other extremely precise machining of surfaces and contours. However, the process has been historically restricted to a small group of materials that are "diamond turnable," that is, materials which do not cause extremely rapid wear of the diamond tool.

This small group of materials typically includes coppers, aluminums, and some nickels, as well as certain plastics, crystals and salts. Many other materials possess more desirable engineering properties, but cause this high rate of wear of diamond tools which precludes useful results. Important examples of materials which cannot currently be efficiently diamond turned are the ferrous materials (i.e. steels and irons). Steels, especially stainless steels, would find a multitude of new applications if it could be diamond turned. For one example stainless steel could be used as molds for aspheric lenses, if it were possible to produce the desired shape to optical class tolerances.

It has been shown that one reason why many materials (especially metals) are not diamond turnable is that the material reacts chemically and detrimentally with the element carbon, which the diamond tool comprises. This detrimental chemical wear may be accompanied by dissolution and diffusion. These reactions cause extremely rapid wear of the tool. It is also known that, in general, the rates of chemical processes are temperature dependent, and that lowering of temperature sharply retards the rate of chemical reactions.

The present invention allows diamond turning of materials which were previously considered non-diamond turnable by providing a method and apparatus for chilling the diamond tool and the workpiece to cryogenic temperatures. This retards the wear rate of the workpiece which is due to reaction with the carbon in the tool to a rate which is comparable with the normal wear due to microfracture, fatigue, or other wear causing mechanisms.

It is an object of the present invention to provide apparatus which will allow the efficient machining of materials which are presently considered to be non-diamond turnable.

It is another object of the present invention to materials which are presently considered to be non-diamond turnable by providing a method and apparatus for chilling the diamond tool and the workpiece to cryogenic temperatures. This retards the wear rate of the workpiece which is due to reaction with the carbon in the tool to a rate which is comparable with the normal wear due to microfracture, fatigue, or other wear causing mechanisms.

It is an object of the present invention to provide apparatus which will allow the efficient machining of materials which are presently considered to be non-diamond turnable.

It is another object of the present invention to provide apparatus for the machining of optical quality complex forms out of materials which are presently considered to be non-diamond turnable.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF TH EINVENTION

To achieve the foregoing and other objects, and in accordance with the purposes of the present invention, as embodied and broadly described herein, the apparatus of this invention may comprise in a diamond turning lathe, the lathe including a diamond tipped cutting tool, and a rotating spindle for holding and rotating a workpiece, a system for machining a workpiece which is detrimental to the diamond tipped cutting tool because of a chemical reaction between the workpiece and said cutting tool, the system comprising first refrigeration means in thermal contact with the diamond tipped cutting tool for chilling the diamond tipped cutting tool to a low temperature, and second refrigeration means in thermal contact with the workpiece for chilling the workpiece to a low temperature.

In a further aspect of the present invention, and in accordance with its objects and purposes, a diamond turning lathe, the lathe including a diamond tipped cutting tool, and a rotating spindle for holding and rotating a workpiece, a method for machining a workpiece which is detrimental to the diamond tipped cutting tool because of a chemical reaction between the workpiece and the cutting tool, comprising the steps of chilling the diamond tipped cutting tool to a low temperature and chilling the workpiece to a low temperature.

BRIEF DESCRIPTION OF THE DRAWINGS

The acoompanying drawings, which are incorporated in and form a part of the specification, illustrate the embodiments of the present invention and, together with the description, serve to explain the principles of the invention. In the drawings.

DETAILED DESCRIPTION

Figure 1:
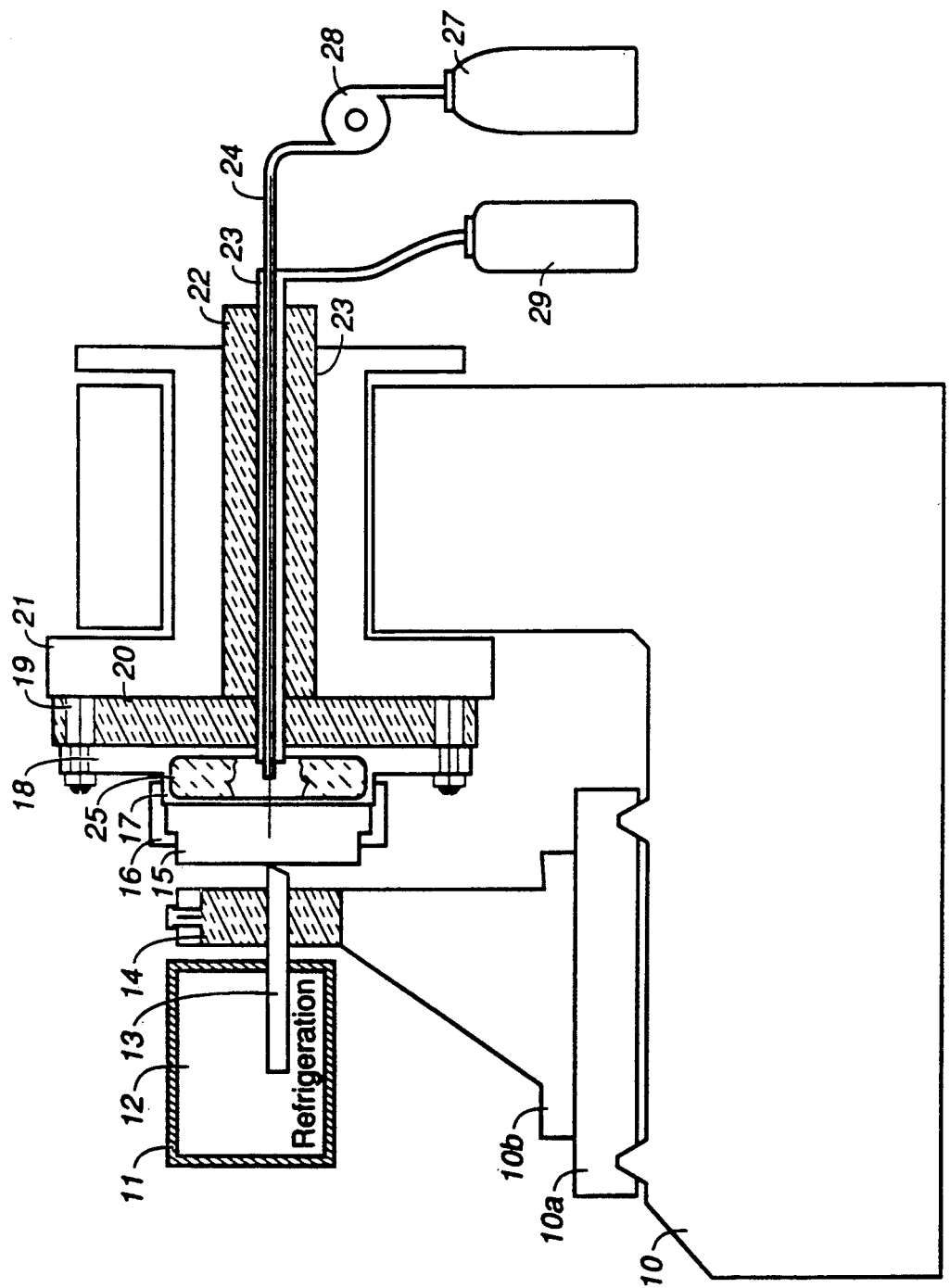
FIG. 1 is partial cross-sectional view of one embodiment of the present invention where a workpiece is mounted to a rotating spindle, and the tool is mounted in the tool post.

The present invention allows the diamond tool machining of ferrous materials, as well as other materials which are difficult to diamond turn, by chilling the workpiece and/or the cutting tool to a temperature low enough to either halt or greatly retard the reaction between the workpiece material and the carbon in the diamond cutting tool. The method by which this is accomplished is easily understood by reference to FIG. 1.

In FIG. 1, the cross-section of a typical diamond turning lathe 10 modified to practice the invention is illustrated. As seen, diamond tipped cutting tool 13 is clamped to tool post 10b in a normal manner, except for intermediate insulating spacer 14, which is used to prevent the transfer of heat to cutting tool 13. Cutting tool 13 is a conventional diamond tipped cutting tool.

Tool post 10b is fixed to lathe carriage 10a, which slides on lathe 10 in a standard manner. The assembly comprising lathe carriage 10a, tool post 10b, tool 13 and intermediate insulating spacer 14 slide on lathe 10 to traverse tool 13 across workpiece 15.

In this embodiment of the invention, the shank of tool 13 is passed into insulated reservoir 11, which contains refrigeration means 12 for refrigerating tool 13. Refrigeration means 12 may be liquid nitrogen or, alternatively, could be a solid-state, Joule-Thompsen, or other type of refrigerator. Any appropriate insulated reservoir can be employed as reservoir 11, and any other arrangement, such as an insulated closed reservoir with inlet and outlet tubing for refrigeration means 12 could be utilized.

The primary requirement for refrigeration means 12 is that it be capable of producing temperatures low enough to attain the desired for tool 13.

In the embodiment of FIG. 1, workpiece 15 is conventionally attached to fixture 18 by nut 16. The surface of fixture 18 which abuts workpiece 15 is copper plated and diamond turned to maximize thermal transfer. Alternatively, vacuum, magnetic or other fixturing systems may be employed, as long as good thermal contact between workpiece 15 and fixture 18 is assured. Fixture 18 is fastened to rotating spindle 21 through insulating spacers 19, again to prevent heat gain from spindle 21.

As in the case of refrigerating tool 13, a liquified gas coolant is used as liquified gas coolant 25 for refrigerating fixture 18 and workpiece 15. In one embodiment, liquified gas coolant 25 is pumped from a liquid nitrogen container such as dewer by pump 28 and through supply tube 24, which passes through axial insulation 22, and into cylindrical cavity 17 of fixture 18. In other embodiments, conventional means such as vacuum dewers and air-spaced insulators could be used in lieu of insulator 22.

Pump 28 may be any pump acceptable for transporting liquid nitrogen, such as a cryogenic pump or a compressed air pump.

The term "pumped," used herein, indicates any method of moving liquified coolant 25 through tube 24. One such method would be to utilize the self pressure of liquid coolant 25 due to evaporation.

Axial insulation 22 fills hollow aperture 26 through spindle 21, insulating supply tube 24 from spindle 21. The stream of liquefied gas coolant 25 flowing through supply tube 24 strikes the inside front of rotating cavity 17, and is thrown radially to its sides as rotating cavity 17 rotates.

As liquified gas coolant 25 warms, it evaporates into a gas, and migrates toward the center of cavity 17, where it is exhausted through coaxial exhaust tube 23 to coolant collection receptacle 29. Thermal insulation 20 and 22 prevent undesired transfer of heat from spindle 21.

With liquified gas coolant 25 in place as shown in FIG. 1, workpiece 15 will be efficiently refrigerated because of the normally good thermal interface with rotating cylindrical cavity 17. In operation, the flow of liquified gas coolant 25 is adjusted so that only a small amount of liquified gas coolant 25, as a gas or liquid, is exiting through coaxial exhaust tube 23. Using liquid nitrogen as liquified gas coolant 12 and liquified gas coolant 25. temperatures of approximately 125° K. for workpiece 15 and tool 13 have been attained.

With both tool 13 and workpiece 15 refrigerated to these temperatures, the present invention has been able to machine large workpieces 15 of previously non-diamond turnable materials with only normal abrasive wear of tool 13. It is envisioned that the invention will enable the production of complex shaped optical quality pieces from such previously non-diamond turnable materials as stainless steel.

Those skilled in the art will readily recognize that it is sometimes desirable to rotate (or orbit) tool 13 while holding workpiece 15 stationary. To accomplish this with the present invention, tool 13 is mounted by way of an adaptor (not shown) to fixture 18, and workpiece 15 is attached to a second fixture 18, which would be attached to tool post 10b. In this case, it is easily understood how the present invention can be utilized to chill both tool 13 and workpiece 15 when they are in this configuration.

The foregoing description of the preferred embodiments of the invention have been presented for purposes of illustration and description. It is not intended to be exhaustive or to limit the invention to the precise forms disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. In a diamond turning lathe, said lathe including a diamond tipped cutting tool, and a rotating spindle, a system for machining a workpiece which is detrimental to said diamond tipped cutting tool because of a chemical reaction between said workpiece and said cutting tool, said system comprising:

first refrigeration means in thermal contact with said diamond tipped cutting tool for chililng said diamond tipped cutting tool to a low temperature;

second refrigeration means in thermal contact with said workpiece for chilling said workpiece to a low temperature, said second refrigeration means comprising:

a supply of a liquified gas coolant;

pump means connected to said supply of a liquified gas coolant for pumping said liquified gas coolant;

first pipe means connecting said pump means to said rotating spindle of said diamond turning lathe for conveying said liquified gas coolant to said rotating spindle;

second pipe means coaxial with said first pipe means for conveying warmed liquified gas coolant from said rotating spindle to a coolant collection receptacle.

2. The apparatus as described in claim 1, wherein said second liquified gas coolant comprises liquid nitrogen.

3. The apparatus as described in claim 1, wherein said first refrigeration means comprises a solid state refrigerator.

4. The apparatus as described in claim 1, wherein said first refrigeration means comprises a Joule-Thompsen refrigerator.

5. The apparatus as described in claim 1, wherein said pump means comprises compressed air.

6. The apparatus as described in claim 1, wherein said pump means comprises a cryogenic pump.

7. The apparatus as described in claim 1, wherein said pump means comprises pressure from evaporation of said liquified gas coolant.

* * * * *